KEIZO SHIMANO AND
TAKASHI SEGAWA
INVENTORS

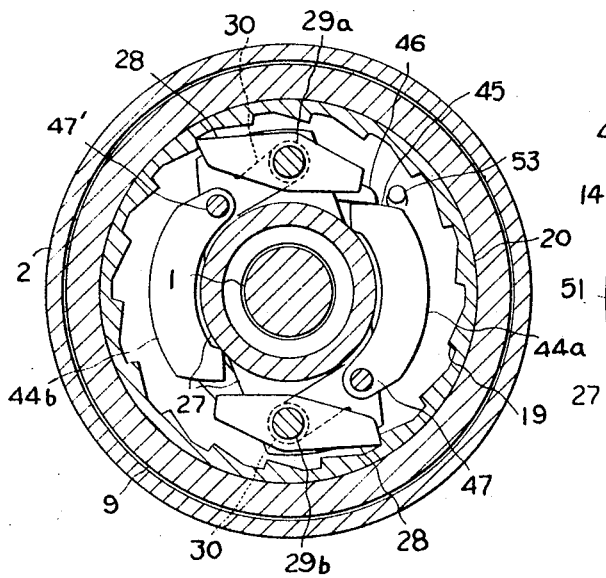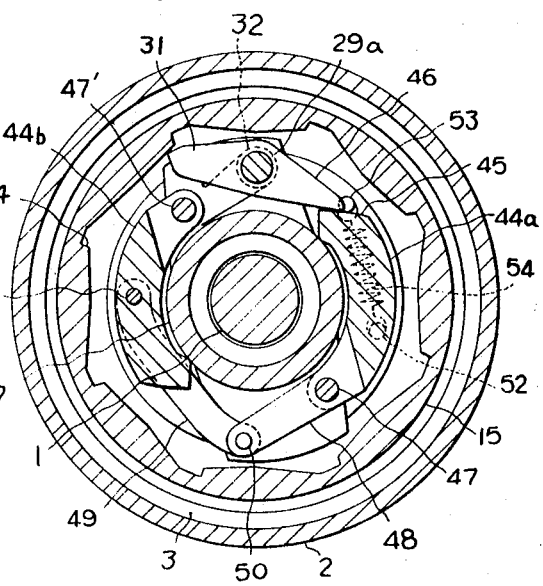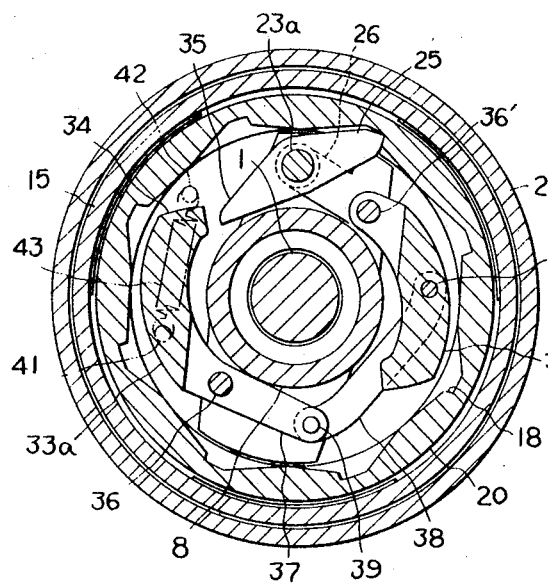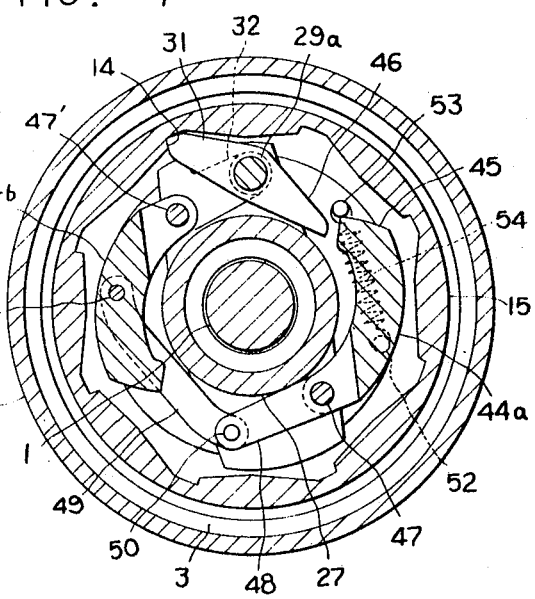

United States Patent Office 3,513,726
Patented May 26, 1970

---

3,513,726
AUTOMATIC THREE-STAGE SPEED CHANGE BICYCLE HUB
Keizo Shimano and Takashi Segawa, Sakai, Osaka, Japan, assignors to Shimano Kogyo Kabushiki Kaisha, Osaka, Japan
Filed July 25, 1968, Ser. No. 747,700
Claims priority, application Japan, Aug. 12, 1967, 42/51,742
Int. Cl. F16h 3/74
U.S. Cl. 74—752                          1 Claim

ABSTRACT OF THE DISCLOSURE

This invention relates to an automatic three-stage speed change bicycle hub, which comprises a driving sleeve having a usual driving sprocket wheel, a planetary gear mechanism provided between said driving sleeve and the hub shell, a high speed-ratio transmission ratchet gearing, a low speed-ratio transmission ratchet gearing, both ratchet gearings being associated with said driving sleeve and the internal gear of said planetary gear mechanism, and centrifugal governor weights adapted to effect operative engagement and disengagement of said high speed-ratio transmission ratchet gearings according to speed of rotation of the driving sprocket wheel.

---

Heretofore, it has been proposed to provide a centrifugal governor weight within a bicycle hub equipped with speed change mechanism, which governor weight being responsive to speed of rotation of the driving sprocket wheel and adapted for automatically controlling the speed change mechanism. In such conventional three-stage speed change hub, the arrangement and construction of parts and elements are relatively complicated. Accordingly an object of the present invention is to provide improved rear wheel hub equipped with an automatic three-stage speed change mechanism which is not subject to the foregoing disadvantages.

Another object is to provide such speed change hub without increasing the cost thereof or complicating its manufacture and assembly.

Other and further objects of the invention will be obvious upon an understanding of the illustrative embodiment about to be described, and various advantages not referred to herein will occur to one skilled in the art upon employment of the invention in practice. In the accompanying drawings:

FIGS. 2 to 5 are cross-sections taken along lines II—II, III—III, IV—IV and V—V, respectively, of FIG. 1; and FIGS. 6 and 7 are cross-sections corresponding to FIGS. 3 and 5 respectively, showing the position of the elements when the centrifugal governor weights have been operated.

Figure 1:
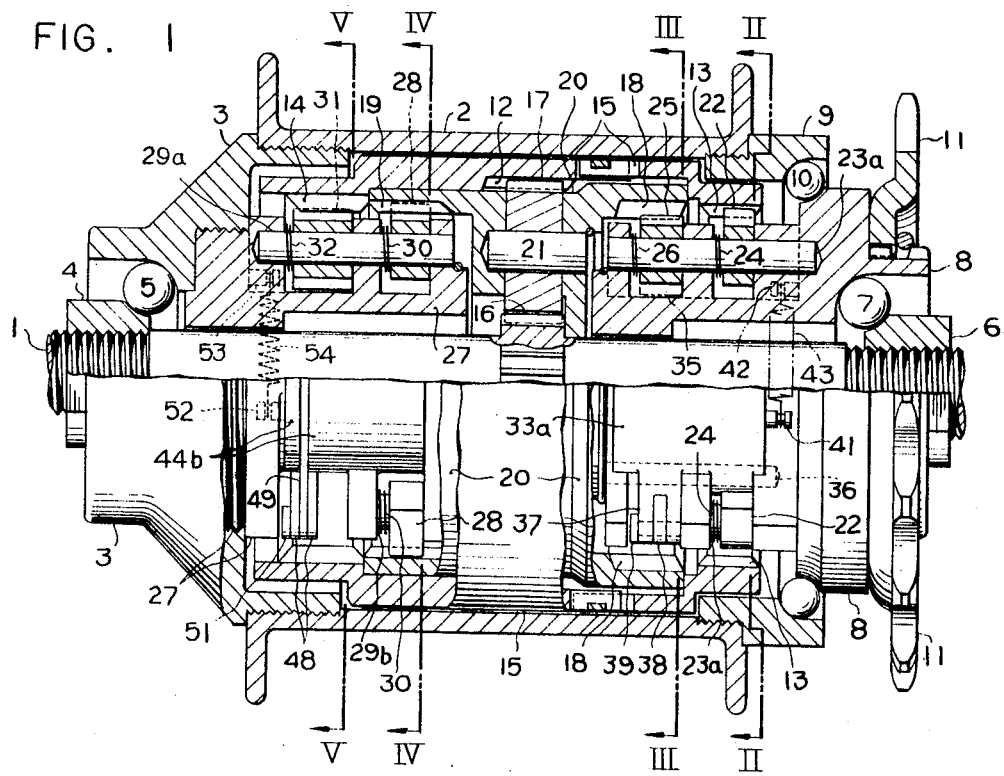
FIG. 1 is a rear view in longitudinal section of the three-stage speed change hub constructed according to the present invention, showing elements in reduced speed-ratio transmission condition.

Referring to the drawings, the reference numeral 1 designates a rear wheel dead axle of a bicycle, and 2 is a hub shell having at the lefthand end a mount drum 3 which is supported by a ball bearing consisting of a bearing race cone 4 and balls 5. At the righthand end, the hub shell 2 has a mount drum 9 which is supported by a ball bearing consisting of bearings balls 10 on an inner race formed on a driving sleeve 8. This driving sleeve 8 is supported by the axle 1 through a ball bearing consisting of balls 7 and an inner race 6 secured to the axle 1. 11 is a usual driving sprocket wheel 11 fixed to said driving sleeve 8.

15 is an internal gear carrier frame splined and inserted into the hub 2, which carrier frame 15 having an internal gear 12 at the mid portion thereof, and internal ratchet wheels 13 and 14 at the righthand portion and at the lefthand portion respectively. The axle 1 has a sun gear 16, and between said internal gear 12 and the sun gear 16 there are a plurality of planetary pinions 17 loosely mounted on pins 21 and carried by a planet carrier frame 20, thus forming a planetary gear mechanism. On the driving sleeve 8, there are two low speed-ratio transmission pawls 22 loosely mounted on pivots 23a and 23b, which pawls 22 being adapted to be brought into operative engagement with an internal ratchet wheel 18 carried by the internal gear carrier frame 15. Each of said pawls 22 is urged by a spring 24, which spring having a tendency of bringing the tip of the pawl 22 into engagement with the internal ratchet wheel 13, whereby forming a low speed-ratio transmission ratchet gearing. At the position opposing to the internal ratchet wheel 18, there is a high speed-ratio transmission pawl 25 loosely mounted on a pivot 23a and urged by a spring 26 having a tendency of bringing the tip of the pawl 25 into operative engagement with said internal ratchet wheel 18, whereby forming a high speed-ratio transmission ratchet gearing. At the lefthand end portion of the hub shell 2, the mount drum 3 has a rightwardly extending driven member 27, which has a plurality of low speed-ratio transmission pawls 28 loosely mounted on pivots 29a and 29b. Said pawls 28 are adapted to cooperate with the internal ratchet wheel 19 on the carrier frame 20, each of said pawls 28 being urged by a spring 30 which has a tendency of bringing the tip of the pawl 28 into operative engagement with the internal ratchet wheel 19, thus forming a low speed-ratio transmission ratchet gearing. On the driven member 27, at the position opposing to the internal ratchet wheel 14 on the internal gear carrier frame 15, there is a high speed-ratio transmission pawl 31 loosely mounted on said pivot 29a, said pawl 31 being urged by a spring 32 having a tendency of bringing the tip of the pawl 31 into operative engagement with the internal ratchet wheel 14, thus forming a high speed-ratio transmission ratchet gearing.

Figure 2:
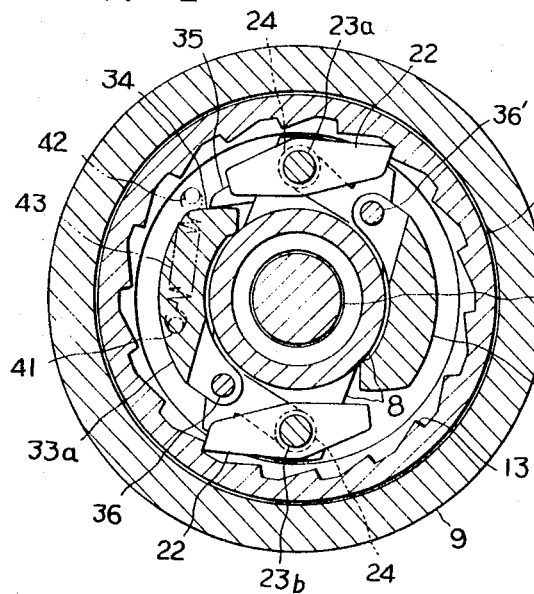
Figure 3:
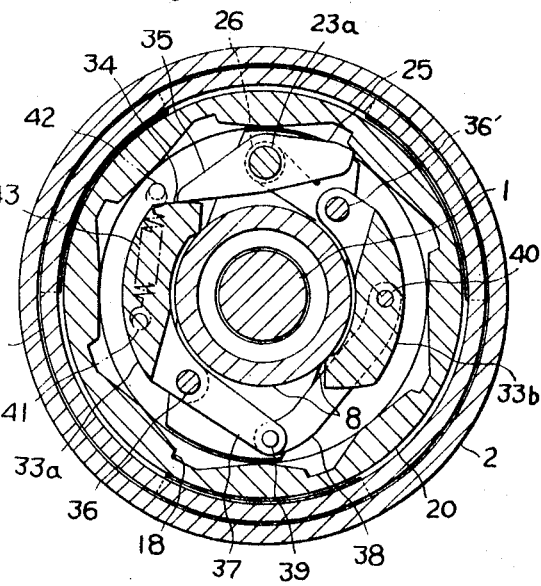

As shown in FIGS. 1 to 3, with respect to the driving sleeve 8, a main centrifugal governor weight 33a is oscillatably mounted on a pivot 36 arranged in such manner that an arcuate abutting face 34 formed at the tip thereof is adapted to abut against the tail 35 of said high speed-ratio transmission pawl 25. In order to eliminate any functional error due to vibration of said main centrifugal governor weight 33a during driving of the bicycle, an auxiliary centrifugal governor weight 33b is oscillatably mounted on a pivot 36', said two centrifugal governor weights 33a and 33b being arranged symmetrically with respect to the axis of the hub. The tail 37 of the main governor weight 33a and the auxiliary centrifugal governor weight 33b are connected by means of a link 38 and pins 39 and 40 in such manner that said governor weights 33a and 33b are adapted to be simultaneously oscillated inwardly or outwardly relative to the axis of the hub. The main centrifugal governor weight 33a has a hook 41, and this hook is connected by means of a tension spring 43 with another hook 42 provided on the driving sleeve 8, whereby giving to the tips of the main and auxiliary centrifugal governor weights 33a and 33b a tendency of being oscillated inwardly relative to the axis of the hub. By such means, in so far as the speed of rotation of the driving sleeve 8 remains lower than a predetermined speed, said governor weights will be held in the inwardly oscillated position against the centrifugal force, so that the abutting face 34 will abut against and suppress the tail 35 of the high speed-ratio transmission pawl 25, holding thereby the tip of the pawl 25 out of operative engagement with the internal ratchet wheel 18. When the speed of rotation of the driving sleeve 8 is increased beyond the predetermined speed, the governor weights 33a and 33b will be oscillated outwardly against the action of the tension spring 43, whereby the suppressed tail 35 of the high speed-ratio transmission pawl 25 will be released, so that the tip thereof will be brought into operative engagement with the internal ratchet wheel 18.

As shown in FIGS. 1 and 5, at the lefthand position, there are main and auxiliary centrifugal governor weights 44a and 44b substantially similarly arranged as the above mentioned governor weights 33a and 33b, each oscillatably mounted on pivots 47, and arranged symmetrically with respect to the axis of the hub. An arcuate abutting face 45 of the main governor weight 44a is adapted to abut against the tail 46 of the high speed-ratio transmission pawl 31. Said governor weights 44a and 44b are adapted to be simultaneously oscillated inwardly or outwardly relative to the axis of the hub. For the purpose of attaining such function, a tail 48 of the main governor weight 44a and the auxiliary governor weight 44b are connected by means of a link 49 and pins 50 and 51. The main governor weight 44a has a hook 52, and this hook is connected by means of a tension spring 54 with another hook 58 provided on the driven member 27, thereby giving a tendency of urging the tips of both governor weights 44a and 44b inwardly relative to the axis of the hub. In so far as the speed of rotation of the hub 2 or the driven member 27 is lower than a predetermined speed, the governor weights 44a and 44b under the action of the spring 54 will be held in the inwardly oscillated position against the action of centrifugal force, whereby the abutting face 45 will abut against the tail 46 of the high speed-ratio transmission pawl 31, so that the tip of said pawl 31 will be held out of operative engagement with the internal ratchet wheel 14. On the other hand, when the speed of rotation of the driven member 27 is increased beyond the predetermined speed, the main and auxiliary governor weights 44a and 44b will be oscillated outwardly against the action of the spring 54, whereby the suppression of the tail 46 of the high speed-ratio transmission pawl 31 will be automatically released, so that the tip of said pawl will be brought into operative engagement with the internal ratchet wheel 14.

With respect to the point of action of the main centrifugal governor weights 33a and 44a, it may be varied according to the strength of the spring 43 and 54, respectively. Thus, said governor weights may be set in such manner that one of the main governor weights 33a and 44a is functioned at the time of change-over of speed from the reduced speed-ratio transmission condition to the normal speed-ratio transmission condition, and that the other is functioned at the time of change-over of speed from the normal speed-ratio transmission condition to increased speed-ratio transmission condition. For instance, the main centrifugal governor weights 33a at the driving sleeve 8 may be so set that it is functioned at the time of change-over of speed from the reduced speed-ratio transmission condition to the normal speed-ratio transmission condition, while the main centrifugal governor weight 44a at the driven member 27 may be so set that it is functioned at the time of change-over from the normal speed-ratio transmission condition to increased speed-ratio transmission condition. In such case, the speed change is effected as follows:

When speed of rotation of the driving sprocket wheel 11 is low, at the start of bicycle driving, the rotation of said sprocket wheel 11 is transmitted through the driving sleeve 8, the low speed-ratio transmission pawl 22, the internal ratchet wheel 13, the internal gear carrier frame 15, the internal gear 12, the planetary pinions 17, the planet carrier frame 20, the internal ratchet wheel 19, the low speed-ratio transmission pawl 28, the driven member 27 and the mount drum 3, to the hub shell 2, under the reduced speed-ratio transmission condition. When the speed of rotation of the driving sleeve 8 is increased, whereby the main and auxiliary centrifugal governor weights 33a and 33b are outwardly oscillated against the action of the spring 43, bringing the high speed-ratio transmission pawl 25 into operative engagement with the internal ratchet wheel 18, the rotation of the sprocket wheel 11 will be transmitted through the planet carrier frame 20, the internal ratchet wheel 19, the low speed-ratio transmission pawl 28, the driven member 27, and the mount drum 3, to the hub shell 2 under the direct route normal speed-ratio transmission condition. When the speed of rotation of the hub shell 2 is further increased, whereby the main and auxiliary centrifugal governor weights 44a and 44b are outwardly oscillated against the action of the spring 54, so that the high speed-ratio transmission pawl 31 is brought into operative engagement with the internal ratchet wheel 14 as shown in FIG. 7, then the rotation of the sprocket wheel 11 is transmitted through the driving sleeve 8, the high speed-ratio transmission pawl 25, the internal ratchet wheel 18, the planet carrier frame 20, the planetary pinions 17, the internal gear 12, the internal gear carrier frame 15, the internal ratchet wheel 14, the high speed-ratio transmission pawl 31, the driven member 27, and the mount drum 3, to the hub shell 2, under increased speed-ratio transmission condition. Under the above-mentioned normal speed-ratio transmission condition and under increased speed-ratio transmission condition, the low speed-ratio transmission pawl 22 is in operative engagement with the internal ratchet wheel 13, but it is to be noted that the said pawl 22 is substantially ineffective, since the internal ratchet wheel 13 always rotates at higher speed than the internal ratchet wheel 18. Under increased speed-ratio transmission condition, the low speed-ratio transmission pawl 28 is also in operative engagement with the internal ratchet wheel 19, but this pawl is substantially ineffective, since the driven member 27 rotates always at higher speed than the internal ratchet wheel 19.

In the above mentioned operation, the main centrifugal governor weight 33a is put into operation according to speed of rotation lower than the speed of rotation at which the other main governer weight 44a operates. But, it may be arranged so as to reverse said relationship, so that the main governor weight 44a is put into operation according to speed of rotation lower than the speed of rotation at which the other governor weight 33a operates. In this case, no substantial difference will be found, and only difference resides in this that the change-over of reduced speed-ratio transmission condition to the normal speed-ratio transmission condition is effected according to the speed of rotation of the hub shell 2, whilst change-over of the normal speed-ratio transmission condition to increased speed-ratio transmission condition is effected in accordance with the speed of rotation of the driving sleeve 8.

From the foregoing it will be seen according to the present invention that the planetary gear mechanism is associated with the driving sleeve and with the hub shell through two ratchet gearings provided with high speed-ratio transmission pawl and low speed-ratio transmission pawl, that the high speed-ratio transmission ratchet gearings are provided with a plurality of centrifugal governor weights adapted to effect operative engagement and disengagement of said ratchet gearings according to the speed of rotation of the bicycle driving, so that the three-stage speed change type bicycle hub according to this invention may be manufactured in compact and inexpensive construction.

What we claim is:

1. Automatic three-stage speed change bicycle hub provided with a driving sleeve having a driving sprocket wheel, comprising a planetary gear mechanism which consists of a rigid sun gear, a plurality of planetary pinions carried by a planet carrier frame, and an internal gear, said planetary gear mechanism being arranged between said driving sleeve and said hub; first high and low speed-ratio transmission ratchet gearing operatively associated with said driving sleeve, said planet carrier frame and said internal gear, second high and low speed-ratio transmission ratchet gearing operatively associated with said internal gear and said planet carrier frame; said first high speed-ratio transmission ratchet gearing having mounted thereon a first centrifugal governor weight means for engagement with said ratchet gearing at a first speed to change the speed of said hub from low to normal; and said second high speed-ratio transmission ratchet gearing having mounted thereon a second centrifugal governor weight means for engagement with said ratchet gearing at a second speed greater than said first speed to change the speed of said hub from normal to high.

References Cited

UNITED STATES PATENTS

| | | | |
|---|---|---|---|
| 3,180,167 | 4/1965 | Paschakarnis | 74—752 X |
| 3,369,429 | 2/1968 | Kimpflinger et al. | 74—752 |
| 3,388,617 | 6/1968 | Nelson | 74—752 |

ARTHUR T. McKEON, Primary Examiner